(12) United States Patent
Burnett

(10) Patent No.: US 7,886,850 B2
(45) Date of Patent: Feb. 15, 2011

(54) DRILLING FLUID SCREENING SYSTEMS

(75) Inventor: George Alexander Burnett, Aberdeen (GB)

(73) Assignee: National Oilwell Varco, L.P., Houston, TX (US)

( * ) Notice: Subject to any disclaimer, the term of this patent is extended or adjusted under 35 U.S.C. 154(b) by 153 days.

(21) Appl. No.: 12/287,711

(22) Filed: Oct. 10, 2008

(65) Prior Publication Data
US 2010/0089651 A1 Apr. 15, 2010

(51) Int. Cl.
E21B 21/06 (2006.01)
B01D 33/00 (2006.01)

(52) U.S. Cl. ............... 175/206; 175/207; 210/780; 210/297; 210/331; 210/359

(58) Field of Classification Search ............. 175/206, 175/207; 210/780, 297, 331, 359, 298, 324, 210/330, 332
See application file for complete search history.

(56) References Cited

U.S. PATENT DOCUMENTS

| | | | | |
|---|---|---|---|---|
| 3,743,094 A | 7/1973 | Mook | | 210/78 |
| 3,747,770 A | 7/1973 | Zentis | | 210/402 |
| 3,953,325 A | 4/1976 | Nelson | | 209/273 |
| 3,966,610 A | 6/1976 | Gibbs | | 210/203 |
| 4,222,988 A | * | 9/1980 | Barthel | 422/309 |
| 4,346,011 A | 8/1982 | Brownstein | | 210/748 |
| 4,639,258 A | 1/1987 | Schellstede et al. | | 55/52 |
| 4,882,054 A | 11/1989 | Derrick et al. | | 210/389 |
| 5,008,010 A | 4/1991 | Langner | | 210/232 |
| 5,454,957 A | 10/1995 | Roff, Jr. | | 210/768 |
| 5,839,521 A | 11/1998 | Dietzen | | 175/66 |
| 6,170,580 B1 | 1/2001 | Reddoch | | 175/66 |
| 6,179,070 B1 | 1/2001 | Dietzen | | 175/66 |
| 6,223,906 B1 | * | 5/2001 | Williams | 210/400 |
| 6,258,282 B1 | 7/2001 | Strid et al. | | 210/780 |
| 6,279,471 B1 | * | 8/2001 | Reddoch | 100/37 |
| 6,506,310 B2 | * | 1/2003 | Kulbeth | 210/780 |
| 6,662,952 B2 | 12/2003 | Adams et al. | | 209/319 |
| 6,669,027 B1 | 12/2003 | Mooney et al. | | 209/405 |
| 6,681,874 B2 | 1/2004 | Risher et al. | | 175/66 |
| 6,763,605 B2 | * | 7/2004 | Reddoch | 34/58 |
| 6,868,972 B2 | 3/2005 | Seyffert et al. | | 209/254 |

(Continued)

FOREIGN PATENT DOCUMENTS

DE 687 820 2/1940

(Continued)

OTHER PUBLICATIONS

PCT/GB2009/051358 International Search Report (Mar. 5, 2010).

Primary Examiner—Kenneth Thompson
Assistant Examiner—Catherine Loikith
(74) Attorney, Agent, or Firm—Williams, Morgan & Amerson, P.C.

(57) ABSTRACT

A system for treating a mixture of drilling fluid and solid material, including a container with an inlet for the introduction of the mixture into the container. The system having a rotatable screen assembly mounted within the container and has at least one screen for screening the mixture and also interior structure for receiving separated drilling fluid from the at least one screen. The system has an interior structure for receiving separated drilling fluid and transmitting the separated drilling fluid to the fluid outlet of the container.

16 Claims, 6 Drawing Sheets

U.S. PATENT DOCUMENTS

| | | | |
|---|---|---|---|
| 7,093,678 B2 | 8/2006 | Risher et al. | 175/66 |
| 7,195,084 B2 * | 3/2007 | Burnett et al. | 175/66 |
| 7,373,996 B1 * | 5/2008 | Martin et al. | 175/206 |
| 2003/0136584 A1 | 7/2003 | Risher et al. | 175/66 |

FOREIGN PATENT DOCUMENTS

| | | |
|---|---|---|
| DE | 35 35 714 A1 | 4/1987 |
| FR | 1.108.828 | 1/1956 |
| WO | WO88/07402 | 10/1988 |

* cited by examiner

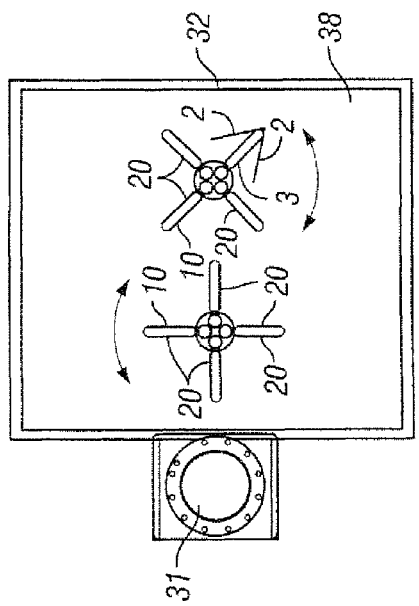
FIG. 2A
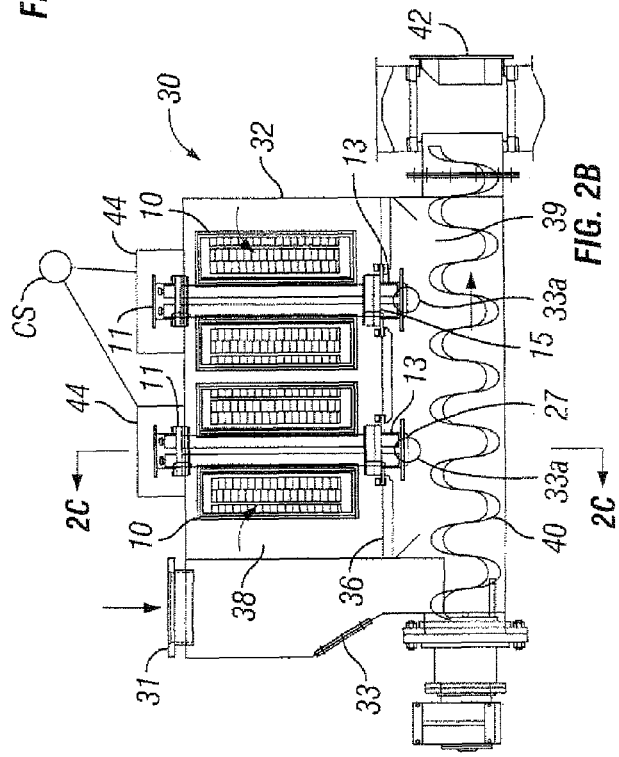
FIG. 2B
FIG. 2C

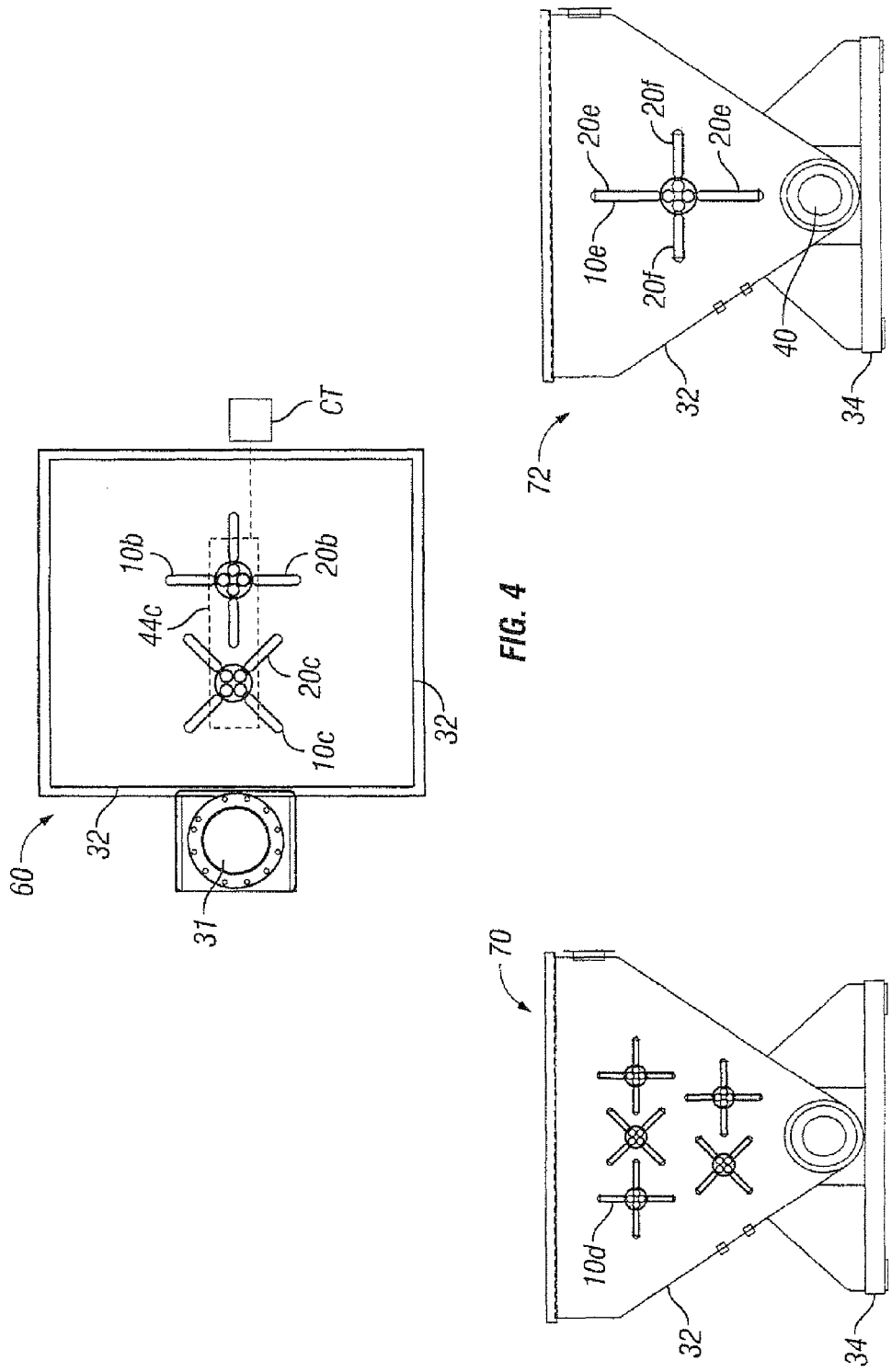

DRILLING FLUID SCREENING SYSTEMS

BACKGROUND OF THE INVENTION

1. Field of the Invention

The present invention is directed to drilling fluid screening systems and methods and, in certain particular aspects, to the use of rotating screen assemblies in such methods.

2. Description of Related Art

In the oil and gas industries, shale shakers use screens which are typically positioned horizontally or at some finite angle to the horizontal to treat drilling fluid contaminated with undesirable solids. Typically such apparatuses have a basket, deck, or other screen holding or mounting structure mounted in or over a receiving receptacle or tank and vibrating apparatus for vibrating one or more screens. Material to be treated is introduced to the screen(s) either by flowing it directly onto the screen(s) or by flowing it into a container, tank, or "possum belly" from which it then flows to the screen(s). Often, the screen or screens used to treat material is sealed in place on a screen deck, in a screen basket, or on screen mounting structure.

In several prior systems it is common to use multiple screens at multiple levels in a shale shaker, e.g., at two or three levels.

There are a variety of known drilling fluid processing systems, shale shakers, and methods for recovery of lost circulation material; including, for example, but not limited to, those in U.S. Pat. Nos. 6,868,972; 6,669,027; 6,662,952; 6,352,159; 6,510,947; 5,861,362; 5,392,925; 5,229,018; 4,696,353; 4,459,207; 4,495,065; 4,446,022; 4,306,974; 4,319,991; and 4,116,288 (all said patents incorporated fully herein for all purposes).

BRIEF SUMMARY OF THE INVENTION

The present invention discloses, in certain aspects, a rotatable screen assembly for screening drilling fluid with solids therein. In certain aspects, such a screen assembly has a hollow elongated center member and a plurality of spaced-apart screen members connected to and projecting out from the hollow elongated center member. Material passing through a screen member moves into and is evacuated from the center member.

In certain particular aspects, such a system has an auger apparatus to remove material which has exited from the center member.

In certain aspects, a system according to the present invention has a plurality of rotatable screen assemblies, each with a plurality of screen members.

In one aspect a screen assembly according to the present invention is positioned with its center member vertical. In other aspects, the center member is positioned horizontally or, instead of horizontally, inclined but not vertical.

The present invention teaches, in certain aspects, new nonobvious systems for treating a mixture, the mixture including drilling fluid and solid material, the systems having a container with an inlet for the introduction of the mixture into the container and a fluid outlet for drilling fluid to exit the container; at least one rotatable screen assembly rotatably mounted within the container and including a center member and at least one screen apparatus with screening material for screening the mixture to separate drilling fluid from the mixture; the rotatable screen assembly including interior structure for receiving separated drilling fluid from the at least one screen apparatus, the interior structure including a passage for drilling fluid to flow from the at least one screen apparatus into the center member; and transmission apparatus in fluid communication with the center member for receiving drilling fluid therefrom and for transmitting the drilling fluid to the fluid outlet of the container.

Accordingly, the present invention includes features and advantages which are believed to enable it to advance drilling fluid screening technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide the embodiments and aspects listed above and:

New, useful, unique, efficient, nonobvious drilling fluid screening systems and methods of the use of these systems;

Such systems with one or more rotatable screen assemblies; and

Such systems with an auger apparatus for removing material exiting from the screen assemblies.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 2A is a partial top view of the system of FIG. 21A.

FIG. 2B is a side cross-section view of a system according to the present invention.

FIG. 2C is a cross-section view along line 2C-2C of FIG. 2B.

FIG. 4 is a top partial view of a system according to the present invention.

FIG. 5 is a cross-section view of a system according to the present invention.

FIG. 6 is a cross-section view of a system according to the present invention.

Figure 1A:
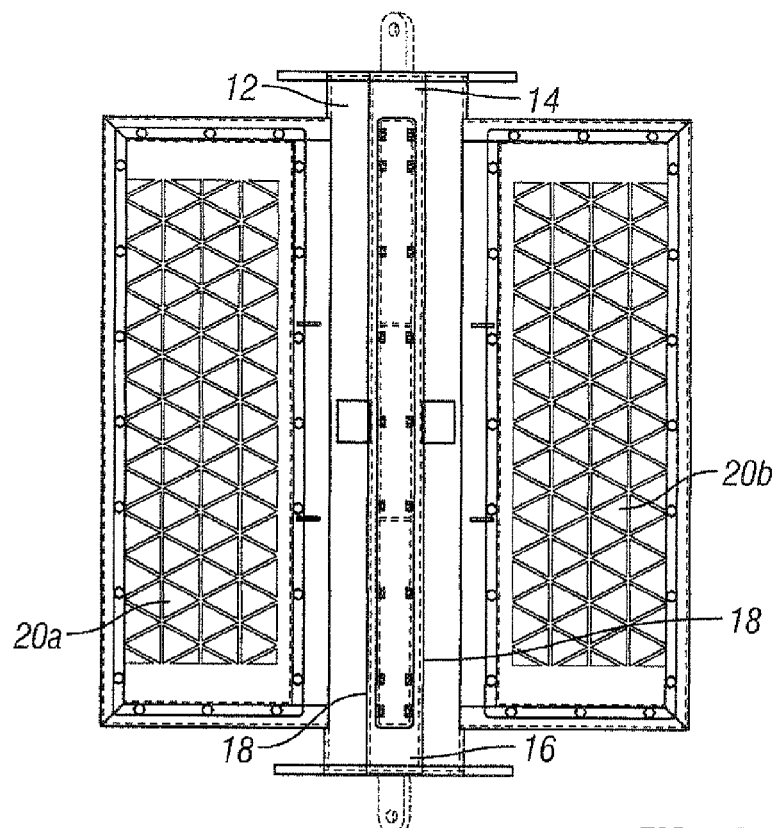
FIG. 1A is a side view of a screen assembly according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

Figure 1B:
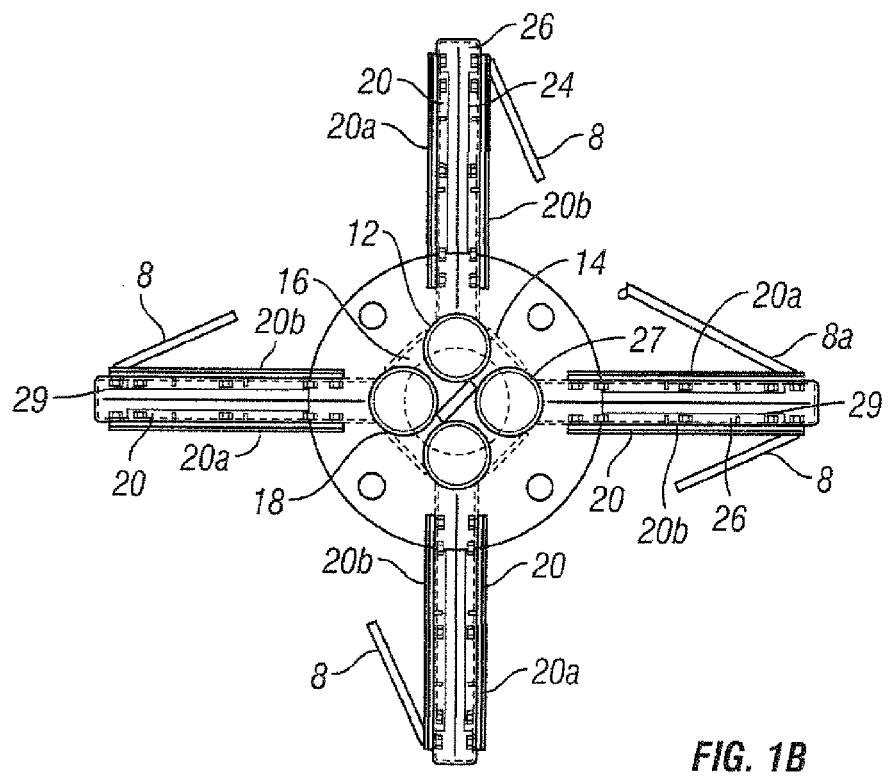
FIG. 1B is an end view of the screen assembly of FIG. 1A.

FIGS. 1A and 1B illustrate a screen assembly 10 according to the present invention which has a center member 12 with a body 14 and an interior channel 16 from one end to the other. A plurality of screen members 20 are connected to the center member 12. The interior of each of the screen members 20 is in communication with a corresponding flow tube 18 within the center member 12 for receiving separated drilling fluid flowing through screens 20a, 20b of each screen member 20. The flow tubes 48 extend along the length of the center member 12. Arrows x, y, z show flow from outside screens 28 into a tube 18.

Each screen member 20 has a body 24 with a central divider 26 which is, for example, a solid sheet or solid plate. It is to be understood that each screen 28 may be any known screen mesh or screening material useful for screening drilling fluid with solids therein. The screening material may include one, two or three layers of screen or mesh connected together or not, and substantially flat or not (e.g., but not limited to, three-dimensional screening material). Optionally, as shown in FIG. 1B, a solid deflector 8 is attached to each screen member 20 to deflect solids (e.g., but not limited to, relatively large solids) away from the screens 28. Optionally, such a deflector is used on both sides of the members 20 (see deflector 8a). The deflectors can be any desired length and at any desired angle to the members 20.

Drilling fluid separated by the screens 20a, 20b from a drilling fluid mixture (e.g. drilling fluid with solids therein, e.g. drilled cuttings, debris, and/or solid drilling fluid additives) which passes through the screens 20a, 20b is moved into a channel 29 formed between a screen and a divider 26. This fluid then flows from the channel 29 out an exit opening 27 into a flow tube 18. The material exits from the flow tubes 18 to a system outlet for re-use and/or for further processing. Solids which do not pass through the screens fall down within a container housing the screen assembly.

FIGS. 2A-2C show a system 30 according to the present invention which has a container 32 on a base 34 with an inlet 31 into which a drilling fluid mixture is introduced into a top 38 of the container 32 and an outlet 33 from which drilling fluid separated by screen(s) of a screen assembly according to the present invention (or drilling fluid with some solids) exits the container 32. It is within the scope of the present invention (or in any container of any embodiment of the present invention) for one, two, three, four, five or more rotatable screen assemblies to be located in the container 32 and/or for the screen assembly or assemblies to be oriented with the center member vertical, horizontal, or inclined from the vertical or from the horizontal.

As shown, two screen assemblies 10 are rotatably mounted in the container 10 with mounts 11, 13 which include bearings 15. The mounts 11 are at a top of the container 32 and the mounts 13 are on supports 36.

Drilling fluid separated from the drilling fluid mixture by the screen assemblies 10 flows down and exits from the exit openings 27 into flow channels 33a in communication with the outlet 33. Solids that do not pass through the screens 20 fall down within the container 32 to a bottom 39 thereof. Optionally, a powered auger apparatus 40 moves the material to an outlet 42. Any suitable auger apparatus may be used. Optionally, any screen 3 of any of the screen assemblies may have two solids deflectors 2 (as is true for any screen in any system according to the present invention).

Rotating apparatus 44 (shown schematically, FIG. 2B) with suitable motors, connections, gearing, and controls CS rotates the rotatable screen assemblies 10. The screen assemblies 10 may be rotated in the same direction, in different directions, and/or in alternating, changing directions. In certain particular aspects the screen assemblies 10 range in area between 144 square inches and 360 square inches of surface area (and in one aspect are about 288 square inches) and are rotated at speeds between 20 rpm's and 230 rpm's.

Figure 3B:
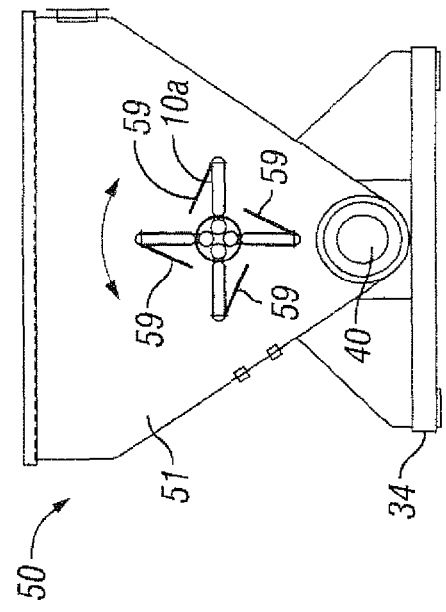
FIG. 3B is a cross-section view along line 3B-3B of FIG. 3A.
Figure 3A:
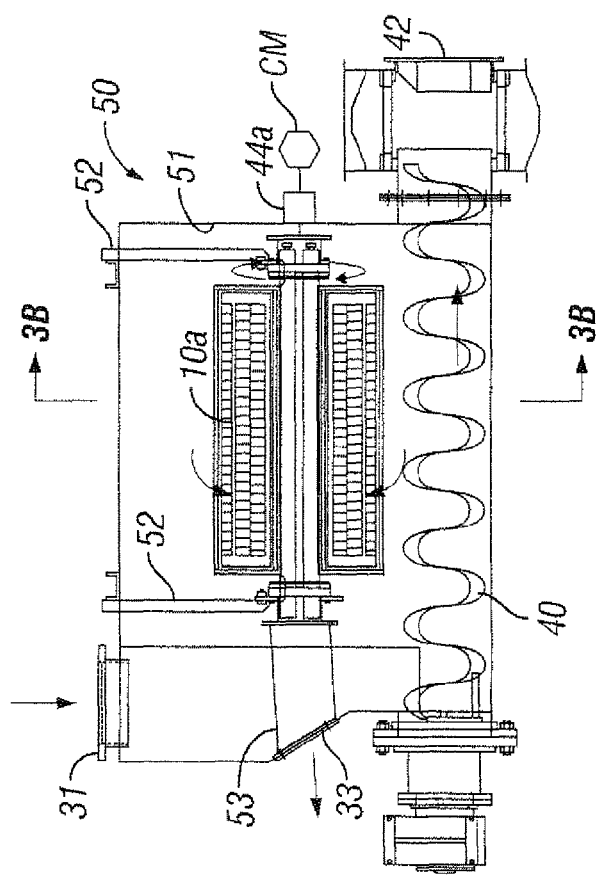
FIG. 3A is a side cross-section view of a system according to the present invention.

A system 50 according to the present invention shown in FIGS. 3A and 3B is like the system 30 (FIG. 2B) and like numerals indicate like parts The system 50 has an inner chamber 51 in which a screen assembly 10a is mounted on supports 52. Treated drilling fluid flows from screen assembly 10a into an outlet tube 53 to the outlet 33. Material separated from the input drilling fluid mixture flows down in the container 32 to the auger apparatus 40. A rotation apparatus 44a, like the rotation apparatus 44, with a control system CM (like the controls CS) controls rotation of the screen assembly 10a. The screen assembly 10a may be like any screen assembly according to the present invention disclosed herein (as may be the screen assembly 10). Optionally, as shown in FIG. 3B, the system 50 may include a deflector 59 for each screen member.

It is within the scope of the present invention for a screen assembly (e.g. like the screen assembly (e.g. like the screen assemblies 10, 10a, 10b, 10c, 10d, 10e) to be mounted non-horizontally and non-vertically at an angle in a container. In a system 50a, FIG. 3C, like the system 50, FIG. 3A, (like numerals indicate like parts), a screen assembly 10z is mounted to the container 32 at an angle.

Figure 3C:
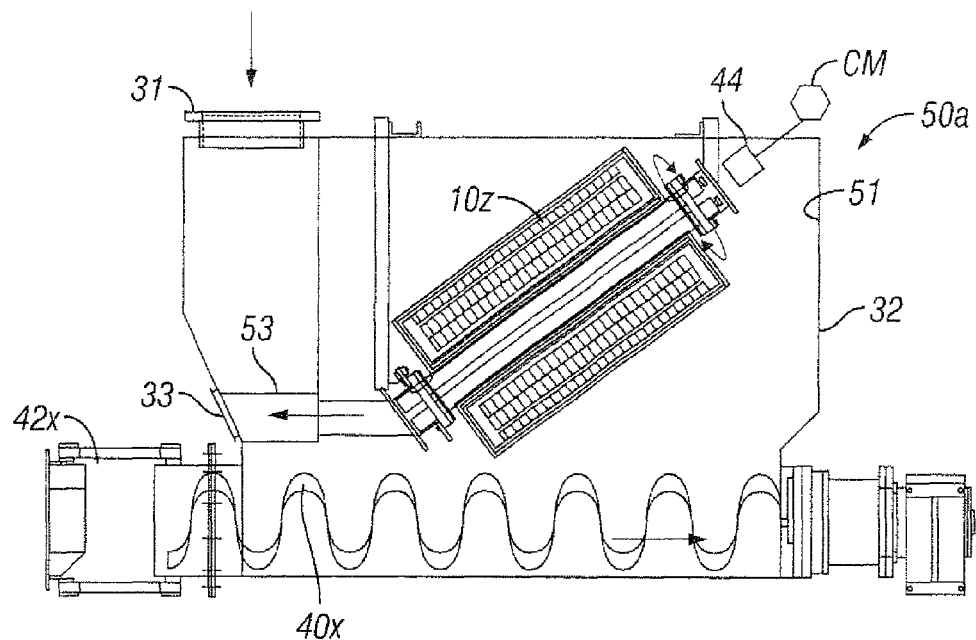
FIG. 3C is a side cross-section view of a system according to the present invention.

Optionally (and as is true for any system according to the present invention) an auger apparatus can auger material generally toward a fluid inlet end of a system. For example, as shown in FIG. 3C, the auger apparatus 40x (like the auger apparatus 40 described above) has an outlet 42x to which solids are moved.

Figure 3D:
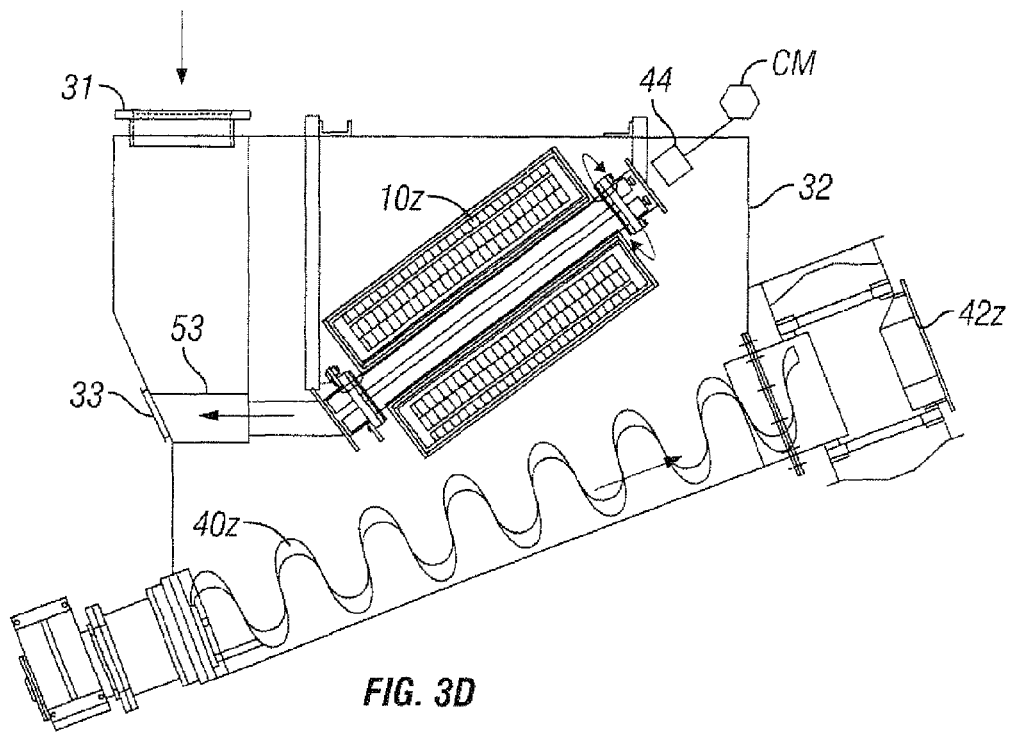
FIG. 3D is a side cross-section view of a system according to the present invention.
Figure 7A:
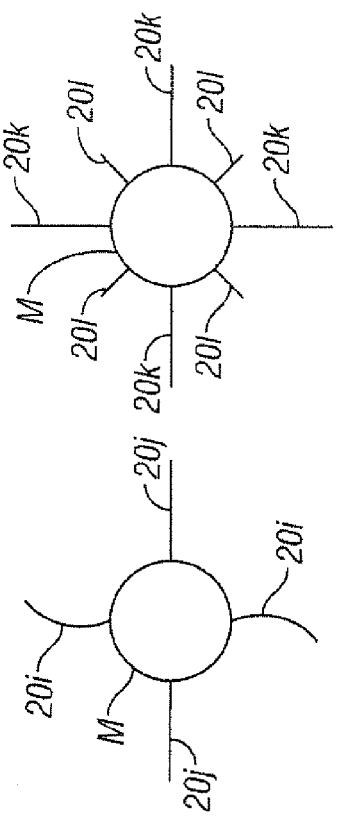
FIG. 7A is a schematic top view of a screen assembly according to the present invention.
Figure 7B:
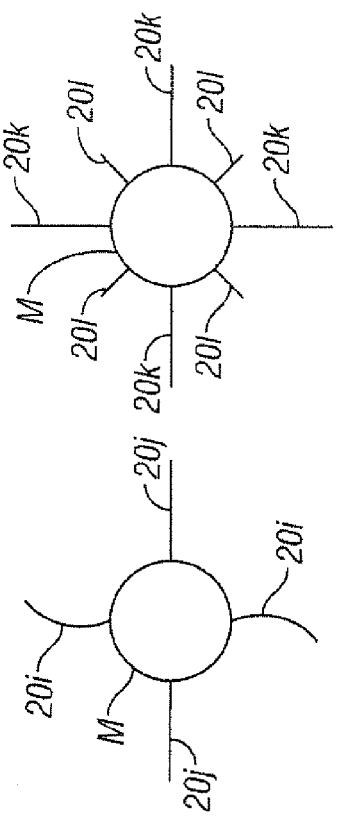
FIG. 7B is a schematic top view of a screen assembly according to the present invention.
Figure 7C:
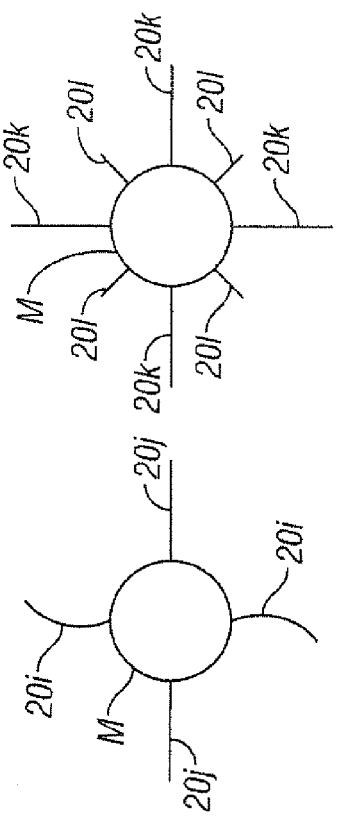
FIG. 7C is a schematic top view of a screen assembly according to the present invention.
Figure 7D:
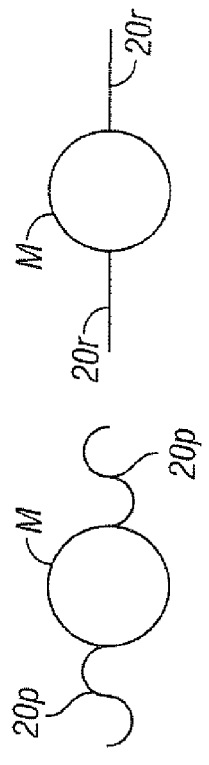
FIG. 7D is a schematic top view of a screen assembly according to the present invention.
Figure 7E:
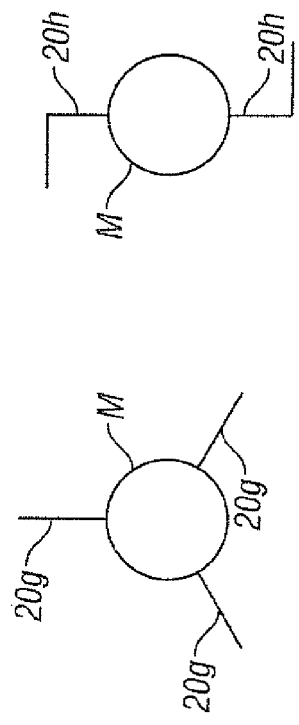
FIG. 7E is a schematic top view of a screen assembly according to the present invention.
Figure 7F:
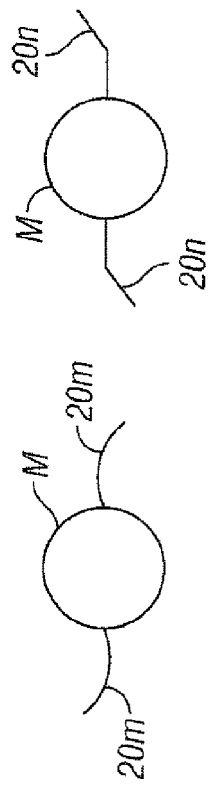
FIG. 7F is a schematic top view of a screen assembly according to the present invention.
Figure 7G:
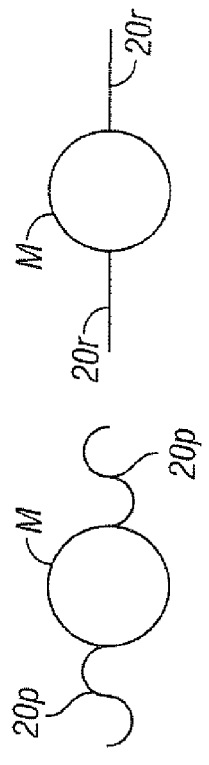
FIG. 7G is a schematic top view of a screen assembly according to the present invention.
Figure 7H:
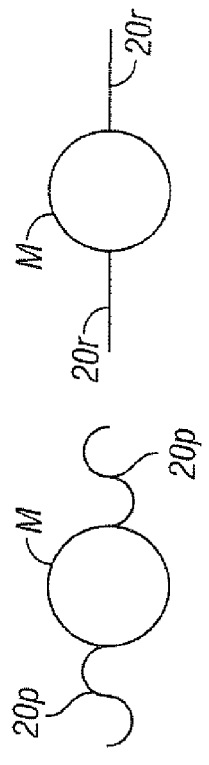
FIG. 7H is a schematic top view of a screen assembly according to the present invention.

As shown in FIG. 3D in a system 50b, an auger apparatus 40z, like the auger apparatus 40 described above, is also positioned non-horizontally and non-vertically for receiving solids which do not pass through the screen assembly 102 and for augering the solids to an outlet 42z.

It is within the scope of the present invention for rotatable screen assemblies according to the present invention to be positioned so that individual screens of one screen assembly are spaced-apart from individual screens of an adjacent screen assembly so that each set of individual screens rotates within its own movement envelope and these envelopes do not overlap (see, e.g. the screen assemblies 10 in FIG. 2A). It is within the scope of the present invention for these movement envelopes to overlap so that during rotation of adjacent rotatable screen assemblies, part of an individual screen of one rotation screen assembly moves between screens of an adjacent rotating screen assembly. For example, as shown in FIG. 4, in a system 60 according to the present invention (like the system 10, FIG. 2B) screens 20b of a rotating screen assembly 10b and screens 20c of a rotating screen assembly 10c move between each other or "mesh" during rotation. This optimizes screen area for the available space and is advantageous because such a configuration increases turbulence within the container and increases the force with which a drilling fluid mixture impacts the screens. A control system CT controls rotation apparatus 44c (shown inside the container 32 but which may be outside) so that the screen assemblies 10b, 10c rotate at a desired speed and so that during rotation individual screens of one screen assembly do not contact individual screens of the other screen assembly.

As shown in FIG. 5, it is within the scope of the present invention to have more than two rotating screen assemblies in a system according to the present invention and/or for the screen assemblies to be located so that as they rotate their individual screens mesh with each other without contacting each other. As shown in FIG. 5 in a system 70 according to the present invention, multiple rotating screen assemblies 10d according to the present invention (like any screen assembly disclosed herein) are rotatable so that their individual screens mesh during rotation, but are maintained in a non-contacting spaced-apart relationship.

It is within the scope of the present invention for a screen assembly according to the present invention to have individual screens which are similar in dimensions or, as shown in FIG. 6, for a screen assembly to have screens of different dimensions. As shown in FIG. 6, a system 72 according to the present invention has a screen assembly 10e according to the present invention with two screens 20e and two screens 20f. The screens 20e are longer than the screens 20f. Different screens on one rotating screen assembly in any system according to the present invention may have screening mesh size that differs from that of another screen in the same system.

It is within the scope of the present invention for straight or flat screen assemblies to project from a center member in a straight line, e.g. as are the screen assemblies 20, FIG. 1B. It is also within the scope of the present invention for the screens of a screen assembly according to the present invention to be non-straight, e.g. curved or with parts at an angle to each other. FIGS. 7A-7H illustrate schematically as viewed on end a variety of possible screen assembly configurations, individual screen shapes, and individual screen orientations with respect to a center member. In each figure "M" indicates a center member (e.g. as in the screen assemblies of FIG. 1B, 3A, 4, 5, or 6. Individual screen assemblies for FIGS. 7A-7H are as follows: 7A, 20g; 7B, 20h; 7C, 20i, 20j; 7D, 20k, 20l; 7E, 20m; 7F, 20n; 7G, 20p; and 7H, 20r.

The present invention, therefore, provides in at least certain embodiments, a system for treating a mixture, the mixture including drilling fluid and solid material, the system including: a container with an inlet for the introduction of the mixture into the container and a fluid outlet for drilling fluid to exit the container; at least one rotatable screen assembly rotatably mounted within the container and including a center member and at least one screen apparatus with screening material for screening the mixture to separate drilling fluid from the mixture; the rotatable screen assembly including interior structure for receiving separated drilling fluid from the at least one screen apparatus, the interior structure including a passage for drilling fluid to flow from the at least one screen apparatus into the center member; and transmission apparatus in fluid communication with the center member for receiving drilling fluid therefrom and for transmitting the drilling fluid to the fluid outlet of the container. Such a screen may have one or some, in any possible combination, of the following: the at least one screen apparatus has an apparatus interior in fluid communication with an interior of the center member, fluid flowing through the screening material flowable into the apparatus interior and from there to the interior of the center member; the at least one screen is four screens spaced-apart on the center member; wherein the at least one screen apparatus having an apparatus interior in fluid communication with an interior of the center member, fluid flowing through the screening material flowable into the apparatus interior and from there to the interior of the center member, each screen apparatus including an exit opening in fluid communication with the center member; wherein there is a plurality of spaced-apart screen apparatuses, the center member has a flow tube for each screen apparatus, and each screen apparatus's exit opening is in fluid communication with a corresponding flow tube; wherein the at least one screen apparatus has two screens mounted thereon, fluid flowable through each screen into the apparatus interior, and the at least one screen apparatus having a divider preventing fluid flowing through one screen from flowing out through the other screen; a deflector connected to the at least one screen apparatus and projecting at an angle therefrom; motor apparatus connected to the rotatable screen assembly to rotate the screen assembly, and a control system for controlling the motor apparatus; wherein a solids outlet is at a bottom of the container, auger apparatus beneath the at least one rotatable screen assembly for receiving solids therefrom, and the auger apparatus for facilitating movement of the solids to the solids outlet; wherein the at least one rotatable screen assembly is positioned with the center member substantially horizontal; wherein the at least one rotatable screen assembly is positioned with the center member substantially vertical; wherein the at least one rotatable screen assembly is positioned with the center member inclined; wherein the at least one screen apparatus is substantially flat and projects in a straight line from the center member; wherein the at least one screen apparatus is curved and projects in a curved line from the center member; wherein the at least one rotatable screen assembly is two spaced-apart rotatable screen assemblies; wherein the two spaced-apart rotatable screen assemblies each have a plurality of screens thereon and projecting therefrom, the rotatable screen assemblies rotatable so that during rotation screens of one rotatable screen assembly do not intermesh with screens of the other rotatable screen assembly; wherein the two spaced-apart rotatable screen assemblies each have a plurality of screens thereon and projecting therefrom, the rotatable screen assemblies rotatable so that during rotation screens of one rotatable screen assembly intermesh with screens of the other rotatable screen assembly; and/or wherein the at least one screen is a plurality of spaced-apart screens and at least one of said plurality is longer than at least one other of said plurality.

The present invention, therefore, provides in at least certain embodiments, a system for treating a mixture, the mixture including drilling fluid and solid material, the system including a container with an inlet for the introduction of the mixture into the container and a fluid outlet for drilling fluid to exit the container; at least one rotatable screen assembly rotatably mounted within the container and including a center member and multiple spaced-apart screen apparatuses each with screening material for screening the mixture to separate drilling fluid from the mixture; the rotatable screen assembly including interior structure for receiving separated drilling fluid from the screen apparatuses, the interior structure including a passage for drilling fluid to flow from the screen apparatuses into the center member; transmission apparatus in fluid communication with the center member for receiving drilling fluid therefrom and for transmitting the drilling fluid to the fluid outlet of the container; the screen apparatuses each having an apparatus interior in fluid communication with an interior of the center member, fluid flowing through the screening material flowable into the apparatus interior and from there to the interior of the center member; each screen apparatus including an exit opening in fluid communication with the center member; the center member has a flow tube for each screen apparatus; each screen apparatus's exit opening is in fluid communication with a corresponding flow tube; each screen apparatus has two screens mounted thereon, fluid flowable through each screen into the apparatus interior; and each screen apparatus having a divider preventing fluid flowing through one screen from flowing out through the other screen.

The present invention, therefore, provides in at least certain embodiments, a method for separating components of a mixture, the mixture including drilling fluid and solid material, the method including: feeding the mixture to a container of a system for treating the mixture, the system as any according to the present invention; flowing the mixture to at least one screen apparatus of the system; separating drilling fluid from the mixture with the screening material on the screen apparatus or apparatuses; flowing separated drilling fluid into a center member of the system and then to a fluid outlet of the container; and flowing separated solids from the at least one rotatable screen assembly of the system to a solids outlet.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A system for treating a mixture, the mixture including a drilling fluid and solid material,
the system comprising a container with an inlet for the introduction of the mixture into the container and a fluid outlet for drilling fluid to exit the container,
at least one rotatable screen assembly rotatably mounted within the container and including a center member and at least one screen apparatus with screening material for screening the mixture to separate drilling fluid from the mixture,
the rotatable screen assembly including an interior structure for receiving separated drilling fluid from the at least one screen apparatus,
the interior structure including a passage for drilling fluid to flow from the at least one screen apparatus into the center member, and
a transmission apparatus in fluid communication with the center member for receiving drilling fluid therefrom and for transmitting the drilling fluid to the fluid outlet of the container, the system further comprising a deflector connected to the at least one screen apparatus and projecting at an angle therefrom.

2. The system of claim 1 wherein the at least one screen apparatus having an apparatus interior in fluid communication with an interior of the center member, fluid flowing through the screening material flowable into the apparatus interior and from there to the interior of the center member.

3. The system of claim 2 wherein the at least one screen apparatus has two screens mounted thereon,
fluid flowable through each screen into the apparatus interior, and the at least one screen apparatus having a divider preventing fluid flowing through one screen from flowing out through the other screen.

4. The system of claim 1 wherein the at least one screen is four screens spaced-apart on the center member.

5. The system of claim 4 wherein the at least one screen apparatus having an apparatus interior in fluid communication with an interior of the center member,
fluid flowing through the screening material flowable into the apparatus interior and from there to the interior of the center member, each screen apparatus including an exit opening in fluid communication with the center member.

6. The system of claim 5 wherein there is a plurality of spaced-apart screen apparatuses, the center member has a flow tube for each screen apparatus, and each screen apparatus's exit opening is in fluid communication with a corresponding flow tube.

7. The system of claim 1 further comprising a motor apparatus connected to the rotatable screen assembly to rotate the screen assembly, and a control system for controlling the motor apparatus.

8. The system of claim 1 further comprising wherein a solids outlet is at a bottom of the container, auger apparatus beneath the at least one rotatable screen assembly for receiving solids therefrom, and the auger apparatus for facilitating movement of the solids to the solids outlet.

9. The system of claim 1 wherein the at least one rotatable screen assembly is positioned with the center member inclined.

10. The system of claim 1 wherein the at least one screen apparatus is substantially flat and projects in a straight line from the center member.

11. The system of claim 1 wherein the at least one screen apparatus is curved and projects in a curved line from the center member.

12. The system of claim 1 wherein the at least one rotatable screen assembly is two spaced-apart rotatable screen assemblies.

13. The system of claim 12 wherein the two spaced-apart rotatable screen assemblies each have a plurality of screens thereon and projecting therefrom, the rotatable screen assemblies rotatable so that during rotation screens of one rotatable screen assembly do not intermesh with screens of the other rotatable screen assembly.

14. The system of claim 12 wherein the two spaced-apart rotatable screen assemblies each have a plurality of screens thereon and projecting therefrom, the rotatable screen assemblies rotatable so that during rotation screens of one rotatable screen assembly intermesh with screens of the other rotatable screen assembly.

15. The system of claim 1 wherein the at least one screen is a plurality of spaced-apart screens and at least one of said plurality is longer than at least one other of said plurality.

16. A system for treating a mixture, the mixture including drilling fluid and solid material, the system comprising
a container with an inlet for the introduction of the mixture into the container and a fluid outlet for drilling fluid to exit the container, at least one rotatable screen assembly rotatably mounted within the container and including a center member and multiple spaced-apart screen apparatuses each with screening material for screening the mixture to separate drilling fluid from the mixture,
the rotatable screen assembly including interior structure for receiving separated drilling fluid from the screen apparatuses, the interior structure including a passage for drilling fluid to flow from the screen apparatuses into the center member, transmission apparatus in fluid communication with the center member for receiving drilling fluid therefrom and for transmitting the drilling fluid to the fluid outlet of the container,
the screen apparatuses each having an apparatus interior in fluid communication with an interior of the center member,
fluid flowing through the screening material flowable into the apparatus interior and from there to the interior of the center member,
each screen apparatus including an exit opening in fluid communication with the center member, the center member has a flow tube for each screen apparatus, each screen apparatus's exit opening is in fluid communication with a corresponding flow tube, each screen apparatus has two screens mounted thereon, fluid flowable through each screen into the apparatus interior, and
each screen apparatus having a divider preventing fluid flowing through one screen from flowing out through the other screen.

* * * * *